United States Patent [19]
Bower et al.

[11] Patent Number: 5,206,968
[45] Date of Patent: May 4, 1993

[54] PAINT ROLLER

[75] Inventors: Lawrence J. Bower, Milwaukee; Ronald R. Delo, Waukesha; Gerald D. VanZeeland, New Berlin, all of Wis.

[73] Assignee: EZ Paintr Corporation, Milwaukee, Wis.

[21] Appl. No.: 639,082

[22] Filed: Jan. 9, 1991

[51] Int. Cl.$^5$ .............................................. B05C 17/02
[52] U.S. Cl. .................... 15/230.11; 492/29; 492/51; 492/53
[58] Field of Search ............... 15/230, 11; 29/110.5, 29/120, 121.4, 128; 300/21

[56] References Cited

U.S. PATENT DOCUMENTS 4,692,975 9/1987 Garcia ........................ 15/230.11

FOREIGN PATENT DOCUMENTS 0015816 4/1986 Japan ........................ 15/230.11

Primary Examiner—Edward L. Roberts
Attorney, Agent, or Firm—James G. Staples

[57] ABSTRACT

A paint roller having a tubular core formed of thermoplastic material. The thermoplastic material being in the form of a multiplicity of spirally wound plies. The multiplicity of plies comprising an outer ply surrounding and in continuous contact with an inner ply. The plies are in general parallelism with one another and fused to one another in the absence of adhesive. A fabric cover overlies the core and is heat fused to the underlying core in the absence of adhesive.

4 Claims, 2 Drawing Sheets

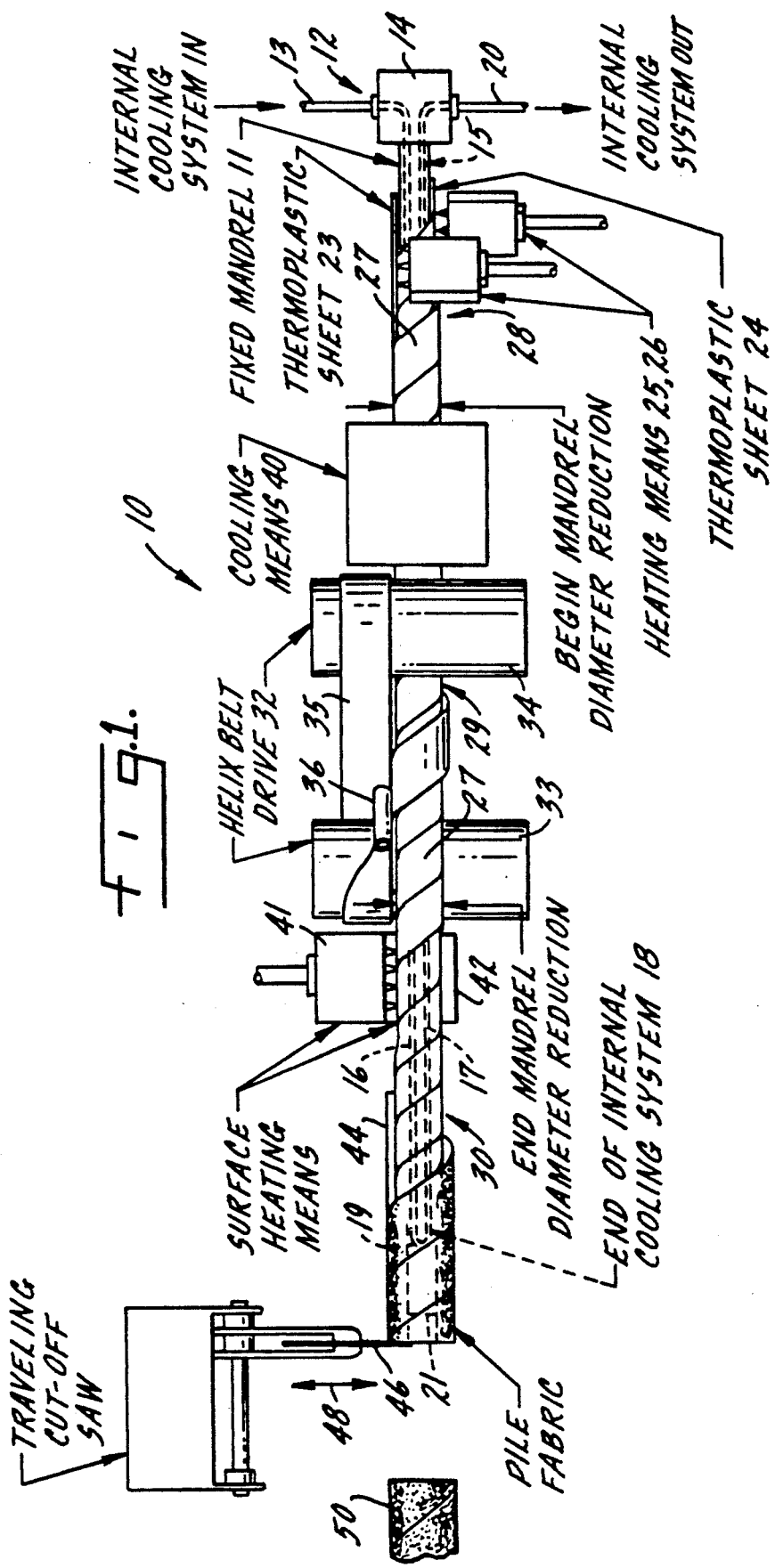

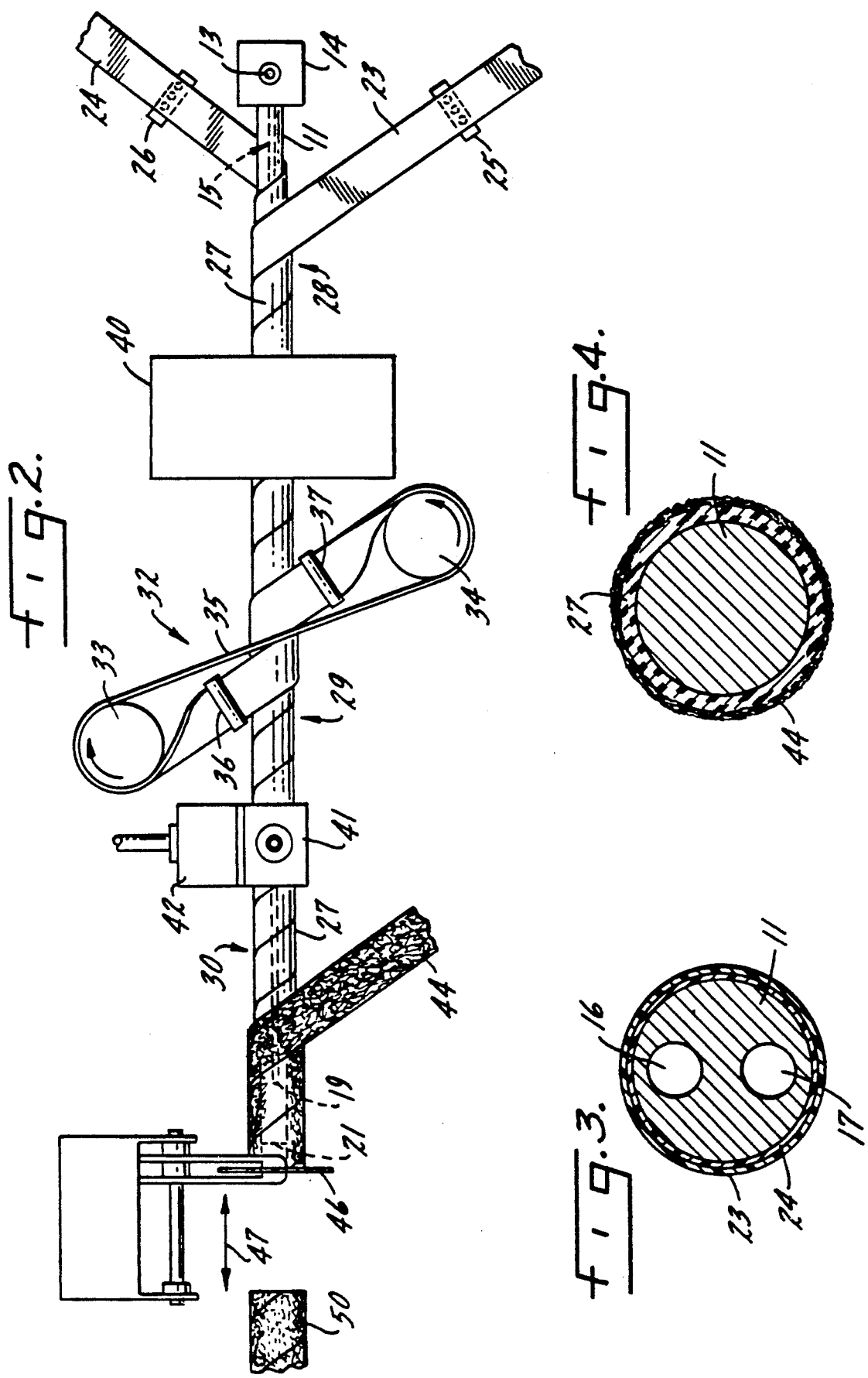

5,206,968

PAINT ROLLER

BACKGROUND OF THE INVENTION

Field Of The Invention

This invention relates generally to the field of paint rollers and, more specifically, to a paint roller with a thermoplastic core and a method of and apparatus for making such a paint roller in a continuous, low cost production method. The final product is a paint roller in which the pile fabric cover is bonded directly to a thermoplastic core, the core having been formed and the pile fabric applied in a continuous, uninterrupted sequence of processing steps.

Two methods of manufacturing pile fabric paint rollers on thermoplastic cores are currently widely used, which methods result in dissimilar, though usable products.

In the first method adhesive is applied to a previously extruded core blank and thereafter pile fabric in strip form is wrapped around the adhesive carrying core blank. After setting of the adhesive, or at least the formation of a good bond between the pile fabric and the adhesive, the core blank is cut into pieces of the desired length which may or may not be further processed, as by trimming the end edges of the pile fabric. This system has several disadvantages including (a) substantial expense and considerable complexity, with the resultant opportunity for production interruption, due to the use of three components—core, adhesive and pile fabric—as contrasted to use of only two components—core and pile fabric, (b) substantial scrap loss due to the need to use preformed, hardened cores of discrete length with consequent wastage at each end, (c) high operating costs in addition to those mentioned earlier if a pre-extruded and cooled core containing no residual heat is reheated to assist in adhesive application, (d) substantial inventory costs associated with stocking preformed cores, and (e) limitation of the resultant roller cover products to organic paint solvents. Controlling the optimum processing characteristics of the adhesive and the specialized equipment for its application can be particularly troublesome.

In the second method, exemplified by U.S. Pat. No. 4,692,975, pile fabric formed with a thermoplastic backing material is applied directly to a compatible thermoplastic core blank, and the use of adhesive with its associated cost and operating drawbacks is thereby eliminated. The elimination of adhesive is a distinct advantage because the thermoplastic materials commonly used have good resistance to paint solvents in contrast to the lesser resistance of components which have been used in the adhesive systems, i.e., thermoplastic materials which can be glued to generally have poor paint solvent resistance. Although this system is a distinct advantage over adhesive type systems, optimum results are not always achieved due to the discontinuous nature of the process. For example, in this system, the thermoplastic core blank is used in a pre-formed, hardened condition of a discrete, maximum length. As a result, some scrappage is inevitable in that both ends of the core blank, after being wrapped with the pile fabric, must be cut off to provide a functionally operative product, thus wasting both portions of the core and the pile fabric resulting from the scrapped end or ends of the otherwise completely formed product. Further, since the core blank must be heated from room temperature or other cold condition prior to application of the pile fabric in order to ensure a good bond between the core and fabric, the energy requirements are still substantial since the core blank has no residual heat.

Although proposals have been made for placing the pile fabric on a heated core, as for example in French Patent Publication 2,093,060, in which pile fabric is placed on a hot, freshly extruded core, it is believed that no such system has gone into practical use, possibly because of the difficulties associated with controlling the shrinkage variation which inevitably occurs in the matching of what is essentially a through heated core blank and a cold (i.e., room temperature, for example) pile fabric.

SUMMARY OF THE INVENTION

It is an object of the present invention to provide a paint roller which does not require adhesive to secure the core to the pile fabric and yet which can be manufactured without regard to numerous and continuous adjustments of the process to take into account variations in shrinkage characteristics of the materials used.

Another object is to provide a paint roller as above described which eliminates scrap or wastage except at the start up or close down of a production campaign whereby scrap is, for all practical purposes, eliminated.

Yet a further object is to provide a simple processing sequence and a manufacturing apparatus for such rollers which is of minimum complexity as contrasted to those proposed by the prior art.

These and other objects are obtained by continuously forming a tubular plastic core, preferably by laying up a two ply wrap over a mandrel with surface heating only of the contacting ply surfaces to form a continuous, endless, unitary thermoplastic core structure, cooling the inside and outside surface of the core structure to a final or near final internal diameter dimension, and, following contracting of the internal core structure to a final desired diameter, heat bonding a compatible thermoplastic pile fabric to the external surface of the core structure, followed by separation of the continuously produced use or further processing.

BRIEF DESCRIPTION OF THE DRAWINGS

The invention is illustrated more or less diagrammatically in the accompanying drawing wherein:

FIG. 1 is a schematic side view of the system of this invention for continuously producing paint rollers without adhesives;

FIG. 2 is a schematic top view of the system of FIG. 1;

FIG. 3 is an illustrative section through the mandrel after the two core plies have been layed up against one another but before fusion has gone to completion; and FIG. 4 is a section through the mandrel and the paint roller after the pile fabric has been layed up against the core structure but before the continuous, at that point, paint roller blank has cleared the end of the mandrel prior to severance.

DETAILED DESCRIPTION OF THE INVENTION

Like reference numerals will be used to refer to like parts from figure to figure in the drawing.

Referring first to FIG. 1 the system for continuously producing paint rollers is indicated generally at 10. The system includes a circular mandrel 11 which, in this instance, is fixed against rotation. The mandrel is solid except for an internal cooling system indicated generally at 12. The cooling system includes a cooling fluid inlet conduit 13 which connects to a header block 14 from which end the internal cooling system 15 of the mandrel extends leftwardly as viewed in FIG. 1. The internal cooling system includes an inlet line 16 and a return line 17, the end portion of the system being, indicated at 18. In this instance, the inlet line 16 and return line 17 are simply parallel passages formed within the solid mandrel 11 and connected by a bend 19 which forms in effect the end portion of the internal cooling system. The return end of return line 17 connects to the cooling system header block 14 and elevated temperature cooling fluid leaves the system through discharge or take away line 20 at the right side of FIG. 1. The end of the mandrel is indicated at 21.

A pair of strips of thermoplastic material are indicated at 23, 24, the strips, or plies, being wrapped around mandrel 11 one above the other, all as best seen in FIG. 2. The underside of each ply is heated by heating means 25, 26 so that upon contacting engagement of the plies, the heated surfaces contact one another and bonding of one ply to another then begins. In the illustrated embodiment the plies are formed from general purpose polypropylene of approximately 0.02 inches thickness and about $2\frac{3}{4}$ inches width. Due to the greater internal diameter of the top ply 23, its width is preferably slightly greater than the width of the bottom ply, as for example on the order of about 1%, although the exact amount of increased width is determined by the thickness of the plies and the angle of feed to the mandrel as well as the inherent requirements of each installation to produce a smooth surface, all of which is determinable by adjustments as will be apparent to those skilled in the art. It should be understood that though a general purpose polypropylene has been described, any suitable thermoplastic material may be used so long as it results in a strong bond, upon application of heat, with itself, and is compatible with later applied pile fabric in the sense that a firm bond may be formed between the core structure and the pile fabric backing.

Since the plies are composed of thermoplastic materials to which heat has been applied prior to contact with one another and with the cooled mandrel, the plies will shrink as they are cooled by the mandrel and individual wraps will fuse tightly against one another. It is believed that recognition of this fact and accommodation of the resultant change in physical dimension that follows is one of the factors which sets this invention apart from the prior art. In this instance this change in physical dimension is accommodated for by varying the size and contour of the mandrel 11. Thus, in a first section, indicated generally at 28, of the mandrel, the outside dimension of the mandrel is preferably of a constant diameter. In a second section, indicated generally at 29, the outside diameter generally tapers to a smaller diameter in the left direction, and in a third section indicated generally at 30, the diameter along this section is the smallest diameter reached at the end of the tapered section 29. Since the cooling system 12 operates continuously, the hot, dimensionally expanded plies 23, 24 will be continuously subjected to the cooling effect and thus continually contracting in physical dimension.

A helix belt drive is indicated at 32 for moving the multi-ply core structure, initially, and the composite core-fabric structure, eventually, to the left until the process of formation is complete. The belt drive may be the well known Ford drive system which includes a pair of upright cylinders 33, 34, and an endless drive belt 35, at least one of the cylinders being a drive cylinder. A pair of hold down rollers 36, 37 cause the drive belt 35 to wrap at least 360 degrees around the mandrels so that adequate frictional engagement between the drive belt and the core structure to ensure rotation of the core, and the core-fabric structure, without slippage is achieved whereby a positive, easily controllable drive action is obtained. Thus, the speed of the entire process, including pulling of the strip materials from their sources, can be controlled by controlling the belt drive system.

As the now multi-ply core structure 27 moves to the left as viewed in FIG. 1 under the driving influence of the belt drive 32, its external surface is subjected to the cooling effect of an external cooling means 40. In a preferred embodiment the specific cooling means 40 consisted of multiple water sprinklers feeding directly onto the core. The resultant rapid cooling creates a rather quick shrinkage effect thereby binding the core structure on the mandrel 11. However, the aforementioned taper in the second section 29 of the mandrel prevents the binding of the core structure to the mandrel to such a degree to interfere in operation. Cooling of the surface of the multi-ply core structure at this point also enables the belt drive to operate without overheating. The result is that a smooth surfaced, substantially stress free core structure leaves the left end 21 of the mandrel 11. As is thus apparent, adjustment, and proper operation, of the cooling system within the limits of operation fixed by the degree of mandrel taper and the temperature of the core structure entering the cooling means all influence the efficient operation of the system. In one embodiment a mandrel which was approximately 1.5 inches in outside diameter at the right end as viewed in FIG. 1 was gradually reduced in diameter by about 1% over a distance of approximately a yard.

The bonding or fusion of the pile fabric to the core structure commences after the core structure leaves the belt drive system 32. Specifically, surface heating means 41, 42 put heat into the exposed surface of the core structure just prior to application of the pile fabric to the core structure. A pair of gas ribbon burners have been used for the heating means 41, 42, the angle of the burner flames being adjusted to get optimum heating effect. The spacing of the burners from the core structure will, of course, vary, but in one embodiment a spacing of about $\frac{1}{2}''$ was found acceptable. It is not necessary or intended that burners 41, 42 heat the core blank completely through. All that is intended is that the core blank is heated to a degree sufficient to ensure good bonding with the subsequently applied fabric. In fact, through heating is undesirable.

The pile fabric is applied to the core structure in strip form as indicated at 44. Since the underside of the fabric strip is compatible with the heated exterior surface of the core structure, a bond between the fabric and core structure will form very quickly with the result that a unitary structure is formed. Since the bonding of the hot core structure to the room temperature fabric strip consumes energy, the joint between the two will cool and partially or fully solidify very quickly. In any event, the strength of the joint so formed will be quite capable of withstanding later downstream handling stresses.

After the composite core-fabric structure becomes self supporting and passes the end 21 of the mandrel, cut off means operate to sever what has theretofore been a continuously produced structure into discrete units. In this instance the cut off means is a travelling cut-off saw 46 which moves (a) in the direction of downstream progression of the composite structure, indicated by the arrow 47 in FIG. 2, and (b) in a direction perpendicular to the direction of downstream progression; see arrow 48 in FIG. 1 which indicates severing movement in directions perpendicular to the axis of mandrel 11.

The right end of a paint roller 50 is indicated generally at the left of each of FIGS. 1 and 2. Following severance, as by the cut-off saw 46, the now-formed paint roller may be packaged preparatory for sale, or further processed, as by end edge trimming which is dictated by commercial and end use considerations.

FIG. 3 represents the condition of the two plies 23 and 24 after they have been layed up, but before the heat energy in the abutting surfaces have completed the fusion/bonding of one ply to another.

By contrast, in FIG. 4 the fusion/bonding process has, at this later stage, gone to completion and, in all probability, the individual plies are so integrally bound to one another that no definite line of demarcation between the two plies can be seen. Further, at this stage in the process the pile fabric 44 has been similarly bonded to the now-unitary core and so again a sharp line of demarcation between the core and the pile fabric will not generally be discernable.

From the foregoing exemplary description it will be seen that a paint roller having a core non-adhesively bonded to a surface fabric is produced in a continuous process. It should be noted that by the use of a conventional festoon feeding assembly the supply of plies 23, 24 and fabric 44 can be endless since the ends of such materials can be joined to form continuous ribbons. As a result, and depending on the quality of the joints in the core plies and pile fabric, the system can operate without stopping for so long as raw materials and power are presented to it. Further, the core has the strength inherent in overlaid structures since the plies are oriented in parallelism with one another.

Although a preferred embodiment of the invention has been illustrated and described, it will at once be apparent to those skilled in the art that modifications may be made within the spirit and scope of the invention. Accordingly, it is intended that the invention not be limited by the foregoing exemplary description but solely by the hereafter appended claims when interpreted in light of the relevant prior art.

We claim:

1. A paint roller, said paint roller including
a tubular core,
said core being formed of thermoplastic material,
said core further being formed from a multiplicity of spirally wound plies of said thermoplastic material,
said multiplicity of plies comprising an outer ply surrounding and in continuous contact with an inner ply,
each of said plies being layed up in general parallelism with one another,
said plies being fused to one another in the absence of adhesive,
said core being of a generally unitary construction having a radially innermost portion oriented in a given direction and a radially outermost portion which overlaps the innermost portion and is oriented in generally the same direction,
said core being composed of polypropylene, and
a fabric cover overlying said multi-ply core,
said fabric cover being heat fused to the underlying multi-ply core in the absence of adhesive.

2. A paint roller, said paint roller including
a tubular core,
said core being formed of thermoplastic material,
said core further being formed from a multiplicity of plies of said thermoplastic material,
said multiplicity of plies comprising an outer ply surrounding and in continuous contact with an inner ply,
each of said plies being layed up in general parallelism with one another,
said plies being fused to one another in the absence of adhesive,
said core being composed of polypropylene, and
a fabric cover overlying said multi-ply core,
said fabric cover being heat fused to the underlying multi-ply core in the absence of adhesive.

3. A paint roller, said paint roller including
a tubular core,
said core being formed of thermoplastic material,
said core further being formed from a multiplicity of plies of said thermoplastic material,
said multiplicity of plies comprising an outer ply surrounding and in continuous contact with an inner ply,
each of said plies being layed up in general parallelism with one another,
said plies being fused to one another in the absence of adhesive, and
a fabric cover overlying said multi-ply core,
said fabric cover being heat fused to the underlying multi-ply core in the absence of adhesive.

4. The paint roller of claim 3 further characterized in that the fabric cover includes a fabric backing which carries a pile fabric, the fabric backing being composed of thermoplastic material.

* * * * *